United States Patent [19]

Ross, Jr.

[11] Patent Number: 4,759,943
[45] Date of Patent: Jul. 26, 1988

[54] CLASSIFICATION OF FOOD MEALS MADE FROM ANIMAL BY-PRODUCTS

[75] Inventor: William M. Ross, Jr., Moravian Falls, N.C.

[73] Assignee: Holly Farms Poultry Industries, Inc., Wilkesboro, N.C.

[21] Appl. No.: 769,166

[22] Filed: Aug. 23, 1985

[51] Int. Cl.$^4$ ................................................ A23K 1/00
[52] U.S. Cl. ..................................... 426/646; 426/480; 426/807
[58] Field of Search ............... 426/641, 646, 478, 480; 209/148, 139 A

[56] References Cited

U.S. PATENT DOCUMENTS

| | | |
|---|---|---|
| 3,020,160 | 2/1962 | Downing et al. . |
| 3,063,840 | 11/1962 | Sullivan ................ 426/480 |
| 3,078,165 | 2/1963 | Alberts . |
| 3,090,487 | 5/1963 | Doyle ................... 209/148 |
| 3,112,203 | 11/1963 | Watt ..................... 426/480 |
| 3,134,795 | 5/1964 | Greenfield ............ 426/480 |
| 3,271,160 | 9/1966 | Kopas et al. . |
| 3,434,593 | 3/1969 | Sullivan ................ 209/148 |
| 3,590,995 | 7/1971 | Truckenbrod ........ 209/148 |
| 3,594,182 | 7/1971 | Baudhuin . |
| 3,615,657 | 10/1971 | Gastrock . |
| 3,625,704 | 12/1971 | Andre et al. . |
| 3,677,703 | 7/1972 | Minnick ................ 209/139.2 |
| 3,960,714 | 6/1976 | Strauss ................. 209/148 |
| 4,066,535 | 1/1978 | Strauss ................. 209/139.2 |
| 4,137,335 | 1/1979 | Holm et al. .......... 426/480 |
| 4,216,239 | 8/1980 | Gloppestad .......... 426/480 |
| 4,389,423 | 6/1983 | Madsen . |
| 4,565,709 | 1/1986 | Berce et al. .......... 426/641 |

OTHER PUBLICATIONS

Taggart Handbook of Mineral Dressing, John Wiley & Sons, New York (1945), pp. 9-01 to 9-02 and 9-29 to 9-32.

Alpine publication; "Protein Enrichment in Vegetable Products by Air Classification"; by Dr. O. Lauer and H. Prem.

Alpine publication; "Mikroplex-Spiral Air Classifier MPVI".

Primary Examiner—R. B. Penland
Attorney, Agent, or Firm—Bell, Seltzer, Park & Gibson

[57] ABSTRACT

A method of concurrently producing a first feed meal having a higher than average mineral content and a second feed meal having a higher than average protein content. The method comprises separating a mixture of finely ground particles of animal feed meal made from animal byproducts into a firt fraction composed of higher density particles and a second fraction composed of lower density particles. The first fraction forms a first meal having higher than average mineral content and the second fraction forms a meal having a higher than average protein content.

3 Claims, 1 Drawing Sheet

U.S. Patent
Jul. 26, 1988
4,759,943
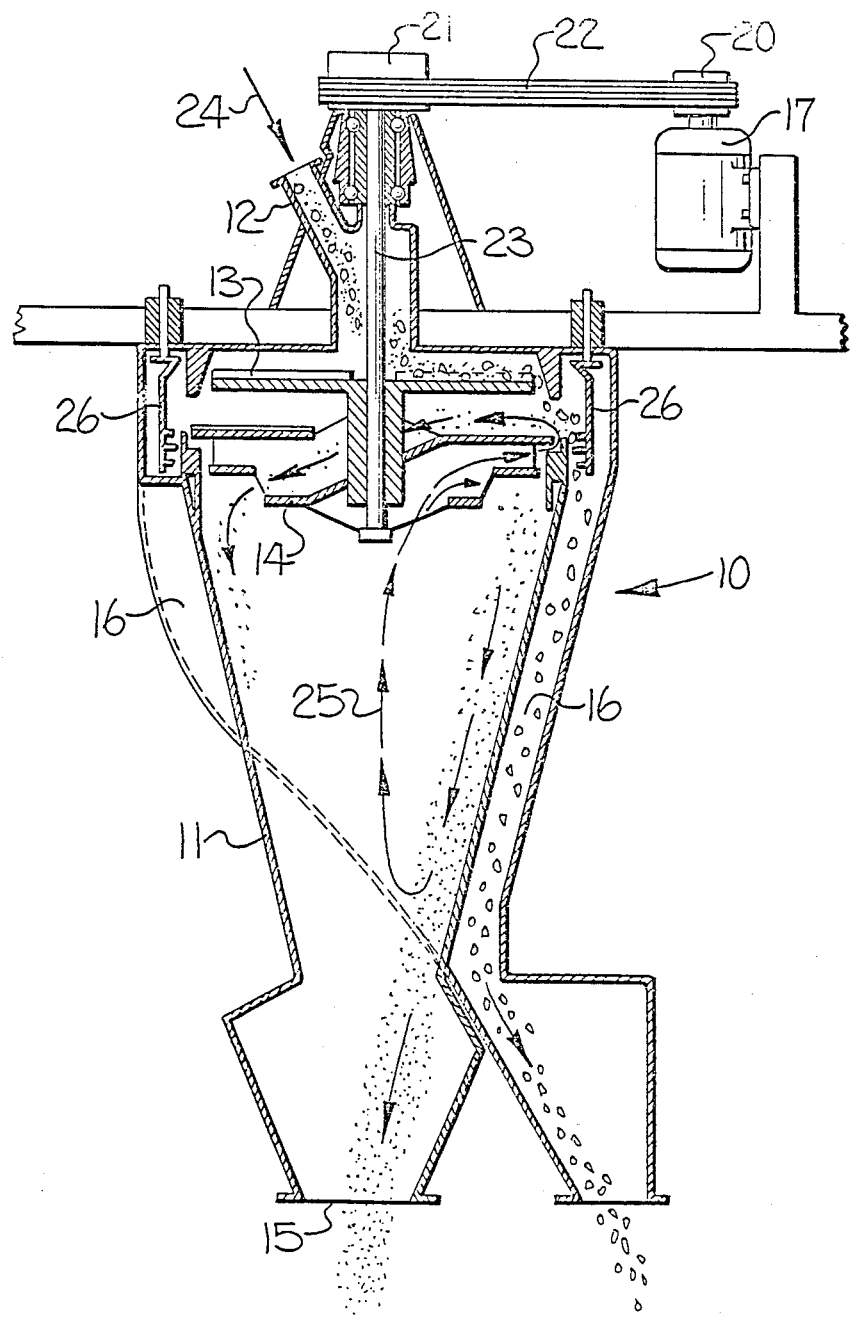

CLASSIFICATION OF FOOD MEALS MADE FROM ANIMAL BY-PRODUCTS

FIELD OF THE INVENTION

The present invention relates to the classification of food meals made from animal by-products and in particular relates to the classification by protein and mineral content of animal feed meals made from animal by-products.

BACKGROUND OF THE INVENTION

The quality of each component in the world's food chain depends to a large extent on the component immediately preceding it. All other conditions being equal, the extent of any person's intake of proteins, carbohydrates, minerals and other essential ingredients will similarly depend upon the respective content of these items in the food consumed by any particular person. In turn, and viewing animal food sources as a particular example, the quality of the animal protein available for human intake will likewise depend to a large extent on the quality of protein made available to animals intended for human consumption. Because animals are generally fed whole grains, grain products, minerals and meals made from animal by-products, the quality of protein in any particular animal will likewise depend on the quality of protein available from these various animals foodstuffs.

As set forth in the preceding paragraph, one source of animal food is feed meal made from animal by-products. Animal by-products are those portions of a butchered animal which are typically unsuitable for direct marketing. For example, although certain cuts of beef, poultry or fish can be marketed to ultimate human consumers in the form in which they are removed from the animal, other less desirable portions of these animals and fish do not command a direct market and consequently must either be processed to form some desirable product or discarded.

In the poultry processing industry, the traditional, marketable portions of a chicken are generally removed from the poultry and packaged at a "processing" plant. Such portions include wings, breasts and legs. Much of the remainder of the chicken must, however, either be discarded or processed further as they are generally not otherwise marketable.

One technique for making use of poultry by-products is "rendering", i.e. the processing of the leftover poultry by-products into some other usable, marketable form. Under current practices, rendering generally includes heating the leftover by-products to a dry, cooked condition. Because poultry and other animal by-products generally contain a substantial amount of oils, these are likewise removed to form a product with both low oil and low water contents. The resulting cooked, dried, de-oiled material may then be ground to form a powder suitable for an animal feed meal and which contains a great deal of the protein and minerals of the original by-products. These proteins and minerals are the same as those in the more desirable parts of the animal and thus marketable if processed to a more desirable form. Additionally, because the original animal or poultry by-products contain bones and other mineral substances as well as meat and other protein substances, the resulting product from a rendering plant comprises a mixture of mineral by-products and protein by-products generally suitable for feeding directly to animals or poultry as part of their nutritional program.

Because of various nutritional requirements of particular animals, the mixture which results from the straight rendering of animal by-products often has a protein and mineral content somewhat different from that which is most desired by animal producers, especially those who feed their animals on a scientific basis. Accordingly, if the feed meal made from the by-products can be tailored to a particular specification, the meal will have a greater value to the customer and can command a higher price to its producer.

In the production of animal feed meals made from animal by-products, screening has been one traditional method of tailoring feed meals to particular nutritional requirements. In a screening process, particles of the feed meal produced in a rendering plant are subjected to a series of size classifications by being allowed to fall through a series of increasingly large holes so that various size particles can be collected and segregated from the original meal. In the case of most of the feed meals made from animal by-products, larger particles tend to have lower protein and higher "ash" contents, while smaller particles tend to have higher protein and lower "ash" contents. "Ash" refers to mineral-type material which remains after the cooking and grinding processes take place in the rendering plant.

Accordingly, the separation of protein-containing particles from mineral-containing particles is the most important parameter in the production of specific higher protein content components and higher mineral content components from the feed meal produced from rendered animal by-products. Although screening can classify according to size, it cannot classify by other characteristics such as density. Because a difference in density rather than a difference in particle size per se is a more typical difference between ash and protein, screen separation cannot provide a totally satisfactory method of separating the two components even though from a broader standpoint it is often adequate for less sensitive purposes.

More precise methods of separating protein from ash have generally revolved around the concept of separation of particles by these characteristic differences in density. For example, one method is gravity classification in which a typical feed meal is fed into a column of upwardly flowing air. Less dense particles are carried upward and separated by the upwardly flowing air current while those particles too dense to be affected by the air flow simply fall under the influence of gravity.

Another method uses a spiral air classifier which sets up a flow of air in a whirlpool-like flow. Less dense particles are carried along with the flow to the center of the "whirlpool" while denser particles are thrown outwardly by centrifugal force. The respective more dense and less dense particles are collected at either the perimeter or the center of the classifier. Both of these techniques are generally known as "air classification," and the change in protein content from the original mixture to the classified component is known as "protein shifting."

The aforementioned techniques have been generally satisfactory when used on vegetable by-products because the density difference between the protein components of vegetable products and the non-protein components is rather great. Accordingly, air classification of protein meals made from vegetable by-products can effectively isolate a component having double the protein content of the original mixture of by-products. Thus, air classification can increase the protein content of meals made from vegetable by-products such as cottonseeds, pea and bean powders, seed kernels and most traditionally, wheat flour.

Nevertheless, such techniques have heretofore not been used to accomplish protein shifting in meals made from animal by-products. One reason is that screen technology is most familiar to the animal rendering industry. More significantly, because the components of animal feed meals made from animal by-products do not span as wide a range of densities as do meals made from vegetable by-products, it was heretofore not recognized that classification by density could have any significant effect upon the protein content of particular feed meals made from animal by-products.

It is thus an object of the present invention to provide a method of concurrently producing feed meals made from animal by-products which have higher than average protein contents and feed meals made from animal by-products having higher than average mineral contents.

It is a further object of this invention to produce animal feed meals having a higher than average mineral content and animal feed meals having higher than average protein content.

It is a further object of this invention to provide a method of rendering animal by-products to produce a first feed meal having a higher than average mineral content and a second feed meal having a higher than average protein content.

It is another object of this invention to produce novel food meals for human or animal consumption having either higher than average protein contents or higher than average mineral contents as desired.

It is a final object of this invention to provide a method of tailoring the production and classification of food meals made from animal by-products to produce specific food meals having desired, predetermined mineral and protein contents.

The foregoing and other objects, advantages and features of the invention, and the manner in which the same are accomplished will become more readily apparent upon consideration of the following detailed description of the invention taken in conjunction with the accompanying drawings which illustrate preferred and exemplary embodiments, and wherein:

FIG. 1 is a simplified cross sectional view of one embodiment of a spiral air classifier suitable for use in a preferred environment of the present invention.

SUMMARY OF THE INVENTION

The present invention provides a method of concurrently producing a first feed meal having a higher than average mineral content and a second feed meal having a higher than average protein content, both feed meals made from a single source of animal feed meal made from animal by-products. The method comprises separating a mixture of finely ground particles of animal feed meal made from animal by-products into a first fraction composed of higher density particles and a second fraction composed of lower density particles whereby the first fraction forms a first meal having higher than average mineral content and the second fraction forms a meal having higher than average protein content.

DETAILED DESCRIPTION OF THE INVENTION

The present invention provides a method of classifying finely ground particles of animal feed meal formed from animal by-products according to their protein and mineral content. Once classified, the meal is separated into desired fractions having different, higher protein and higher mineral contents, respectively.

In its broadest sense, the invention comprises separating the meal into the two respective fractions simply by classifying them according to their density. In this broad sense, the method comprises subjecting an animal feed meal made from animal by-products to concurrent forces each of which by their nature will have a greater effect on the more dense particles or on the less dense particles, respectively. For most effective separation, a first set of forces acting in a first direction are provided along with a second set of forces which act in a second direction so that the more dense and less dense particles will be urged in differing directions and thereby separated. For the very most effective separation, the difference in direction between the forces should be as great as possible and one method of accomplishing the same is to exert the two respective sets of forces in directions which are substantially normal, i.e. perpendicular, to one another. Additionally, the respective first and second forces should have a difference in magnitude significant enough to accomplish an appropriate separation.

One preferred embodiment of the invention comprises concurrently subjecting finely ground particles of animal feed meal made from animal by-products to centrifugal and lifting forces. Because centrifugal force is proportional to the mass of a particle upon which it acts, particles of differing masses will be differently affected by a centrifugal force of a given magnitude. Accordingly, where a mixture of particles of different size, mass and density are subjected to concurrent centrifugal and lifting forces, the more dense particles will be more affected by the centrifugal forces while the less dense particles will be more affected by the lifting forces. By providing a method of segregating the particles most affected by the centrifugal forces from those most affected by the lifting forces, at least two groups of particles may be separated from one another, collected and removed.

As set forth earlier herein, animal feed meal made from animal by-products contains a number of types of materials. These include but are not limited to protein, fat, moisture and ash. Generally speaking, proteinaceous materials tend to have a lesser density than the materials which make up the ash. Accordingly, when particles of animal feed meal made from animal by-products are ground to a small size, such as in a hammer mill, those particles which are either slightly larger or more dense or both tend to have a higher ash content while those particles which are slightly smaller or less dense or both tend to have a higher protein content. Accordingly, by collecting the fractions separated by the respective effects of the lifting and centrifugal forces, the more dense particles will form an animal feed meal having a higher mineral content while the less dense particles will form an animal feed meal having a higher protein content.

In air classification systems where the respective forces are centrifugal forces and lifting forces, the centrifugal forces are generally exerted mechanically while the lifting forces must be exerted with an air current. As a result, the centrifugal forces are usually greater in magnitude than the lifting forces and tend to affect the more dense particles while the lifting forces tend to affect the less dense particles.

Because the separation among particles and the resulting degree of adjustment of protein and mineral content is dependent upon the forces exerted and upon the differences in their magnitudes, the invention also provides a method of adjusting the degree of classification or protein shifting in animal feed meals made from animal by-products by either adjusting the relative magnitude of the two sets of forces or by moderating the relative effects of the two respective sets of forces. In other words, either the sizes of the forces themselves can be changed to adjust the degree of separation between different types of particles or, where the magnitude of the forces themselves cannot be easily adjusted, their effects may be moderated after they have acted upon the particles.

As illustrated in FIG. 1, in a preferred embodiment of the invention, finely ground particles of animal feed meal made from animal by-products are introduced into an air classifier broadly designated at 10. The essential working parts of the air classifier include its housing 11, an inlet 12 positioned in upper portions of the housing, a horizontally disposed rotating strewing plate 13 centered in the housing and in communication with the inlet 12, a horizontally disposed rotating crosscurrent fan 14 positioned coaxially beneath and in communication with the strewing plate for providing the upwardly flowing air current and the resulting lifting forces, and respective fines outlet 15 and coarse outlet 16 in communication with the crosscurrent fan and the strewing plate respectively for collecting the coarser and finer fractions of the animal feed meal made from animal by-products. The strewing plate 13 and the crosscurrent fan 14 are both driven by the motor 17 through the drive pulley 20, the driven pulley 21, the belt 22 and the shaft 23.

As illustrated in FIG. 1, a stream of finely ground particles 24 are introduced into the inlet 12 of the air classifier 10. The particles drop onto and impinge upon the strewing plate 13 which, because of its rapid rotation, imparts a centrifugal momentum to the particles and tends to throw them outwardly off of itself. As the particles are thrown off of the strewing plate, they are exposed to the upwardly flowing air current symbolically indicated by the circling arrows 25. As broadly indicated by the drawing, which for purposes of illustration shows exaggerated relative sizes of the particles, the larger or more dense particles are less effected by the lifting forces and tend to be thrown outwardly to the upper portions of the coarse outlet 16 through which they fall and are collected.

At the same time, the less dense particles, having been less affected by the centrifugal force imparted by the strewing plate 13, are more affected by the upwardly flowing air current 25 within which they may become entrained and cause to temporarily flow in a circulating manner within upper portions of the housing 11 until they eventually fall towards and then out of the fines outlet 15.

In order to moderate the relative effects of the centrifugal and lifting forces provided by the air classifier, a brake ring 26 is positioned outwardly of and surrounding the strewing plate 13 and the crosscurrent fan 14. By adjusting the position of the break ring 26, the relative effects of the centrifugal and lifting forces can be moderated to change the degree of separation between the more dense and less dense particles. As set forth earlier, changing the degree of size and density between the particles will likewise change the protein and mineral contents of the respective feed meals which are produced at the fines outlet 15 and the coarse outlet 16.

In the particular embodiment of air classifier shown in FIG. 1, it will be noted that the lifting forces are directed so as to flow upwardly from the crosscurrent fan towards the strewing plate so that the less dense particles are not only lifted but also directly inwardly and allowed to fall through passageways defined in the crosscurrent fan and from thence downward towards the fines outlet 15.

According to the present invention, it has been discovered that keeping the finely ground particles in a heated condition while they are subjected to the respective forces helps accomplish the most precise and accurate classification when using the air classifier. Heating prevents agglomeration of the particles such that agglomerations of less dense particles are not "mistaken" for larger or more dense particles and hence misclassified. In other words, heating helps keep the particles separate from one another so that they are most accurately and precisely classified, particularly by the embodiment of the invention which utilizes an air classifier.

Where one particular type of high mineral content or high protein content meal is desired, the invention provides a method of producing the single meal simply by treating a mixture in the method indicated and collecting either the finer fraction or the coarser fraction as desired.

Additionally, because of the unique separation provided by air classification, a preferred embodiment of the invention includes a first unique feed meal made from poultry by-products which comprises at least about 72 percent by weight protein and less than about 10 percent by weight ash and a second unique feed meal also made from the same poultry by-products which comprises at least about 5 percent by weight calcium, at least about 2.8 percent by weight phosphorous and and at least about 62 percent by weight protein.

It is to be understood that such characteristic percentages of various proteins and minerals in food meals produced according to the present invention are an inherent function of the characteristic percentages of these materials present in the by-product starting materials. Accordingly, some food meals produced according to the method of the invention will be characterized by uniquely high contents of proteins or minerals while others will be characterized by unique blends of protein and mineral content made possible by the invention.

Overall, the invention provides a method of concurrently producing high protein content animal feed meals along with high mineral content animal feed meals both formed from a single source of animal by-products by cooking animal meat and viscera materials, drying the cooked materials, removing a substantial portion of resulting oils from the materials, grinding the materials to form finely ground particles, and separating the finely ground particles into respective first and second fractions composed of higher density particles and lower density particles whereby the first higher density fraction forms a first meal having a higher than average mineral content and the second fraction forms a feed meal having a higher than average protein content. In a specific embodiment, the invention provides a method of producing the respective animal feed meals from meat and viscera materials which comprise poultry by-products.

Furthermore, it will be understood by those familiar with density classification that the invention is not limited to the use of two sets of forces to provide two separated fractions and two types of feed meals. Instead, it will be recognized that a plurality of feed meals having a respective plurality of protein and mineral content characteristics can be produced in any mechanical system which can separate materials into a plurality of fractions according to their density.

Although the invention has been described with respect to animal feed meals, the end use of the products produced by the invention are not limiting upon the invention and it will be seen that meals classified and produced according to the present invention can be used for human food meals or for any other appropriate purpose as desired without in any way changing or limiting scope of the invention or of the claims.

EXAMPLE

Two control mixtures of animal feed meal made from poultry by-products were analyzed and had the following characteristics before and after classification according to the present invention.

| Description | Percentage By Weight: | | | |
| --- | --- | --- | --- | --- |
| | Protein | Ash | Calcium | Phosphorous |
| Control after classification | 67.8 | 13.66 | 3.57 | 2.14 |
| Fines | 72.7 | 9.36 | 1.99 | 1.40 |
| Coarse | 63.7 | 18.03 | 5.18 | 2.82 |
| Control after classification | 68.5 | 12.20 | 3.12 | 1.94 |
| Fines | 75.95 | 7.24 | 1.35 | 1.12 |
| Coarse | 65.25 | 17.22 | 5.15 | 2.82 |

It will thus be seen that when animal feed meals made from poultry by-products are classified according to the present invention, the protein content can be increased by 6 or 7 percentage points (an approximate 10 percent relative increase) in one fraction while the overall calcium and phosphorous contents can be more than doubled in the other fraction. There are thus concurrently produced two animal feed meals, both of which are of greater value than the original unclassified meal from which they were made. Because the market consumers of such feed meals will pay a premium for desirable characteristics, both types of feed meal are economically more attractive than the original meal from which they were made.

The foregoing embodiments are to be considered illustrative, rather than restrictive of the invention, and those modifications which come within the meaning and range of equivalence of the claims are to be included therein.

That which is claimed is:

1. A method of classifying a starting mixture of finely ground substantially similarly sized particles of animal feed meal formed from rendered animal by-products according to protein and mineral content and separating the classified meal into desired fractions having respectively a mineral content higher than that of the starting mixture and a protein content higher than that of the starting mixture, said method consisting essentially of:
   (a) introducing a starting mixture of finely ground substantially similarly sized particles of animal feed meal made from rendered animal by-products into an air classifier having:
      a housing,
      an inlet positioned in upper portions of the housing and into which the starting mixture is introduced,
      a rotating strewing plate centered in the housing and in communication with the inlet,
      a rotating crosscurrent fan within the housing positioned coaxially beneath and in communication with the strewing plate for providing an upwardly flowing air current,
      a fines outlet in communication with the crosscurrent fan, and
      a coarse outlet in communication with the strewing plate;
   (b) directing the starting mixture of finely ground substantially similarly sized particles onto the rotating strewing plate whereby the strewing plate imparts a centrifugal momentum to the finely ground particles and throws the particles outwardly off of the strewing plate;
   (c) subjecting the outwardly thrown particles to the upwardly flowing air current provided by the crosscurrent fan;
   (d) directing a first group of outwardly thrown particles which are least affected by the upwardly flowing air current towards the coarse outlet;
   (e) directing a second group of particles which are most affected by the upwardly flowing air current towards the fines outlet;
   (f) collecting and removing the first group of particles from the coarse outlet; and
   (g) collecting and removing the second group of particles from the fines outlet whereby the first group is primarily composed of more dense particles of the starting mixture and forms a feed meal having a mineral content higher than that of the starting mixture, while the second group is primarily composed of less dense particles of the starting mixture and forms a feed meal having a protein content higher than that of the starting mixture.

2. A method according to claim 1 wherein the finely divided ground particles are in a heated condition above ambient temperature prior to introducing the starting mixture into the air classifier.

3. A method according to claim 1 further comprising
   (a) cooking animal meat and viscera materials;
   (b) drying the cooked materials;
   (c) removing a substantial portion of resulting oils from the materials and grinding the materials to form finely ground particles prior to introducing the starting material into the air classifier.

* * * * *